US007298057B2

(12) United States Patent
Mitchell et al.

(10) Patent No.: US 7,298,057 B2
(45) Date of Patent: Nov. 20, 2007

(54) SAFETY SYSTEM AND METHOD FOR A SERIAL PASSENGER SEAT POWER BUS

(75) Inventors: Bradley J Mitchell, Snohomish, WA (US); Kevin S Callahan, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 293 days.

(21) Appl. No.: 11/090,862

(22) Filed: Mar. 25, 2005

(65) Prior Publication Data

US 2005/0230548 A1 Oct. 20, 2005

Related U.S. Application Data

(60) Provisional application No. 60/556,748, filed on Mar. 27, 2004, provisional application No. 60/556,826, filed on Mar. 27, 2004, provisional application No. 60/556,823, filed on Mar. 27, 2004, provisional application No. 60/556,747, filed on Mar. 27, 2004, provisional application No. 60/557,044, filed on Mar. 27, 2004.

(51) Int. Cl.

*H02H 3/00* (2006.01)
*H02H 5/00* (2006.01)
*H02H 11/00* (2006.01)

(52) U.S. Cl. ........ 307/9.1

(58) Field of Classification Search ........ None

See application file for complete search history.

(56) References Cited

U.S. PATENT DOCUMENTS

| | | | | |
|---|---|---|---|---|
| 4,428,078 | A | 1/1984 | Kuo | |
| 4,763,360 | A | 8/1988 | Daniels et al. | |
| 4,853,555 | A | 8/1989 | Wheat | |
| 6,601,798 | B2 | 8/2003 | Cawley | |
| 6,704,181 | B2 * | 3/2004 | Saksa | 361/64 |
| 2002/0101695 | A1 * | 8/2002 | Saksa | 361/64 |

* cited by examiner

*Primary Examiner*—Michael Sherry
*Assistant Examiner*—Adi Amrany
(74) *Attorney, Agent, or Firm*—Harness, Dickey & Pierce, P.L.C.

(57) ABSTRACT

A safety system for an electrical distribution system that insures voltage sufficient to power user devices interfaced to the distribution system is only provided when the distribution system is fully functional and not damaged. The safety system comprises the power distribution system, a power control box, and a circuit activator signal generator in electrical communication with the power distribution system. The power control box is electrically coupled to the power distribution system and is operable to generate a first signal of a first voltage and a second signal of a higher second voltage. The power control box communicates the first signal to the circuit activator signal generator. Upon receipt of the first signal, the circuit activator signal generator generates a third signal having a third voltage that is lower than the second voltage and communicates the third signal to the power control box. The power control box provides the second signal to the power distribution system upon receipt of the third signal and does not provide the second signal if the third signal is not received.

17 Claims, 6 Drawing Sheets

CASG
34
24
14
26
28
28
CAB
32
38
36
Master Switch
10
30
115 VAC
50
Controller

26
High Resistance Low
Impedance Circuit
34
CASG
10
LPF
42
44
40
14
28
Seat Column
Power Control Box
(PCB)
38

SAFETY SYSTEM AND METHOD FOR A SERIAL PASSENGER SEAT POWER BUS

CROSS-REFERENCE TO RELATED APPLICATIONS

This application claims the benefit of U.S. Provisional Application No. 60/556,748, filed on Mar. 27, 2004, which is incorporated herein by reference.

The following applications are also incorporated by reference herein: provisional application Ser. No. 60/556,826 filed on Mar. 27, 2004; provisional application Ser. No. 60/556,823 filed on Mar. 27, 2004; provisional application Ser. No. 60/556,747 filed on Mar. 27, 2004; provisional application Ser. No. 60/557,044 filed on Mar. 27, 2004; U.S. application Ser. No. 10/810,324 filed on Mar. 27, 2004; U.S. application Ser. No. 10/898,729 filed on Jul. 23, 2004; U.S. application Ser. No. 10/936,004 filed on Sep. 8, 2004; U.S. application Ser. No. 10/983,906 filed on Nov. 8, 2004; and U.S. application Ser. No. 10/943,035 filed on Sep. 16, 2004.

FIELD OF THE INVENTION

The present invention relates to a safety system for a power bus in a mobile platform, such as an aircraft, and more particularly to a safety system for a serial passenger power bus in the seating columns of an aircraft.

BACKGROUND OF THE INVENTION

Aircraft passengers are increasingly demanding in-flight entertainment (IFE) and electrical power outlets to operate various personal electronic devices, such as laptop computers, at their seats. To provide the passenger with such features, electrical power and data must be delivered to each seat. Conventionally, power and data are delivered to aircraft passenger seats via numerous cables that, during aircraft assembly, are laid out in position on the floor of the aircraft passenger cabin. A portion of the cables is positioned beneath a covering, such as the seat track cover, and a portion that includes connectors to the seats is left exposed to connect with the yet to be installed seat groups containing each passenger seat.

During installation of the seat groups, the seat groups must be carried in over the exposed wires. Taking care to avoid the exposed wires increases both the complexity of the operation and the amount of time required to install the seats. Once the seats are installed, installers must crawl along the floor of the aircraft to manually attach each wire to each seat group. This process is cumbersome and time consuming. Further, in order to change the configuration of the seats or to replace the seats, an installer must again crawl along the floor, disconnect the wiring from each group, and maneuver the seats around the exposed wiring. Still further, in order to change the position of the seat groups, the aircraft must be re-wired so that the wiring will reach the seats in their new positions. As would be expected, re-wiring an aircraft is a costly and time consuming process.

One solution is to provide an improved device for delivering power to aircraft passenger seat groups. Such a device includes a power bus and a connector operable to provide a connection between the power bus and the passenger seats. Power and/or data can be transmitted between the power bus and the passenger seats, via the connector, at any point along the power bus, thus eliminating the need to run separate connections between the power and/or data source and each passenger seat.

However, in running the power current through the power bus and passenger seats, it is possible that an interruption or break within the system may occur. For example, a wire or connector could detach, or a passenger seat may not be properly coupled to the power bus. Accordingly, it would be desirable to provide a safety system that switches off the power supply to the power bus system when a break in the circuit is detected.

SUMMARY OF THE INVENTION

A safety system for an electrical distribution system that insures voltage sufficient to power devices attached to the distribution system is only provided when the distribution system is intact. Thus, the safety system limits the likelihood that damage will occur due to an impaired electrical distribution system.

In one embodiment, the present invention provides for a safety system comprising a power distribution system, a power control module, and a signal generator in electrical communication with the power distribution system. The power distribution system transmits power to access points located throughout the platform. The power control module is electrically coupled to the power generating source that generates a first signal of a first voltage and a second signal of a second voltage for distribution throughout the power distribution system. The first voltage is lower than the second voltage. The signal generator is in electrical communication with the power distribution system that is operable to receive the first voltage and generate a third signal of a third voltage. The third voltage is lower than the second voltage. The power control module communicates the first signal to the signal generator through an entirety of the power distribution system. Upon receipt of the first signal, the signal generator generates the third signal and communicates the third signal to the power control module via the power distribution system. The power control module generates the second signal and communicates the second signal to the power distribution system upon receipt of the first signal. The power control module does not provide the second signal to the power distribution system if the third signal is not received.

In another embodiment, the present invention provides for a safety system for a power distribution system in a mobile platform. The safety system comprises a power control module, a signal generator, and a power distribution system electrically coupled between the power control module and the signal generator. The power control module provides a first signal of a first voltage to the signal generator through the power distribution system. The power control module provides a second signal of a second voltage greater than the first voltage to the power distribution system upon receipt of an activation signal from the signal generator. The activation signal is transmitted back to the power control module if the electrical integrity of the power distribution system is intact. The power control module refrains from providing the second voltage to the power distribution system when the activation signal is not transmitted back to the power control module and the electrical integrity of the power distribution system is not intact.

In a further embodiment the present invention provides for a method for communicating electrical signals throughout a mobile platform. The method includes the steps of: generating a first electrical signal of a first voltage by a power control module; transmitting the first signal through a power distribution system to a signal generator circuit; generation of a second signal of a second voltage by a circuit activator signal generator in response to receipt of the first signal by the circuit activator signal generator; generation of a third signal of a third voltage by the power control module upon receipt of the second signal by the power control module, the third voltage being greater than the first voltage and the second voltage. The power control module refrains from generating the third electrical signal when the second signal is not received by the power control module from the power distribution system.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
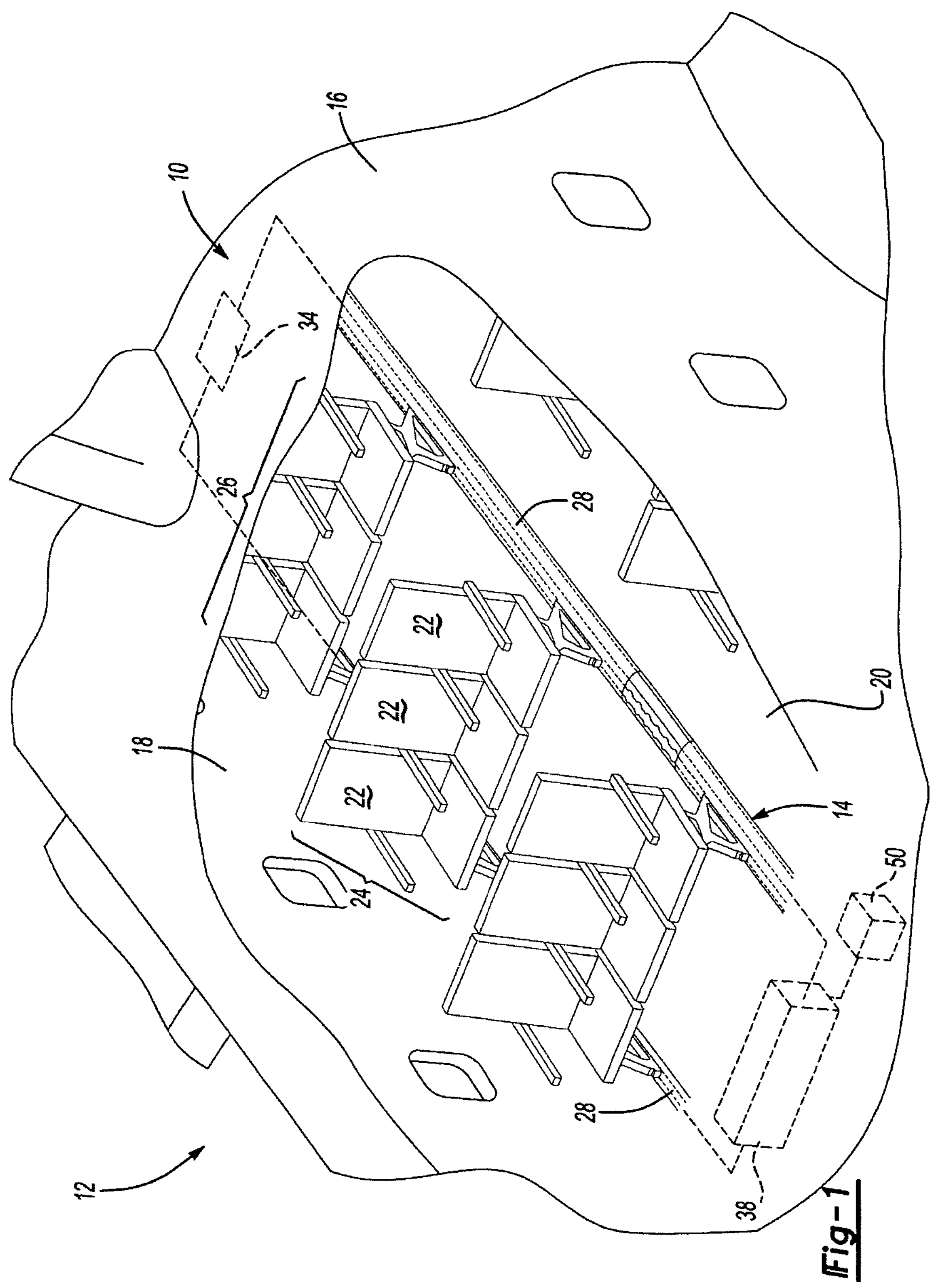
FIG. 1 is a partially cut-away perspective view of an exemplary aircraft with a power distribution system incorporating the safety system of the present invention.

With reference to FIG. 1, a safety system constructed according to the principles of the present invention is generally indicated by reference numeral 10 and is illustrated associated with an exemplary mobile platform 12. In the preferred embodiment, the mobile platform 12 is in the form of a passenger aircraft. It will be appreciated, however, that the present invention is not limited for use only in a passenger aircraft but rather can be implemented in any form of mobile platform, such as a ship, train, bus, motor craft, etc. Moreover, the invention may also be employed in various non-mobile settings, such as, for example, a conference center. The system 10 is usable essentially in any environment/application where electrical power or data needs to be communicated to one or more locations. The mobile platform 12 is equipped with a power distribution system 14 coupled with the safety system 10.

The aircraft 12 generally includes a fuselage 16 which defines a passenger cabin 18 having a floor 20. Coupled to the floor 20 are numerous passenger seats 22. Two or more passenger seats 22 are grouped together as a seat group 24. Two or more seat groups 24 in turn form a seating column 26. A pair of seat tracks 28 extend along the floor 20 along the seating column 26. Each seat track 28 is coupled to the floor 20. Each seating group 24 in turn is coupled to the seat track 28, thereby securing the passenger seats 22 to the floor 20.

The power distribution system 14 is integrally formed with the seat tracks 28. The power distribution system 14 is coupled to a power source 30 to provide power to each of the seating groups 24. This power may be used in the passenger seats 22 for various purposes, such as, for example, powering video screens, audio output, lighting controls, phones, or internet connections.

Figure 2:
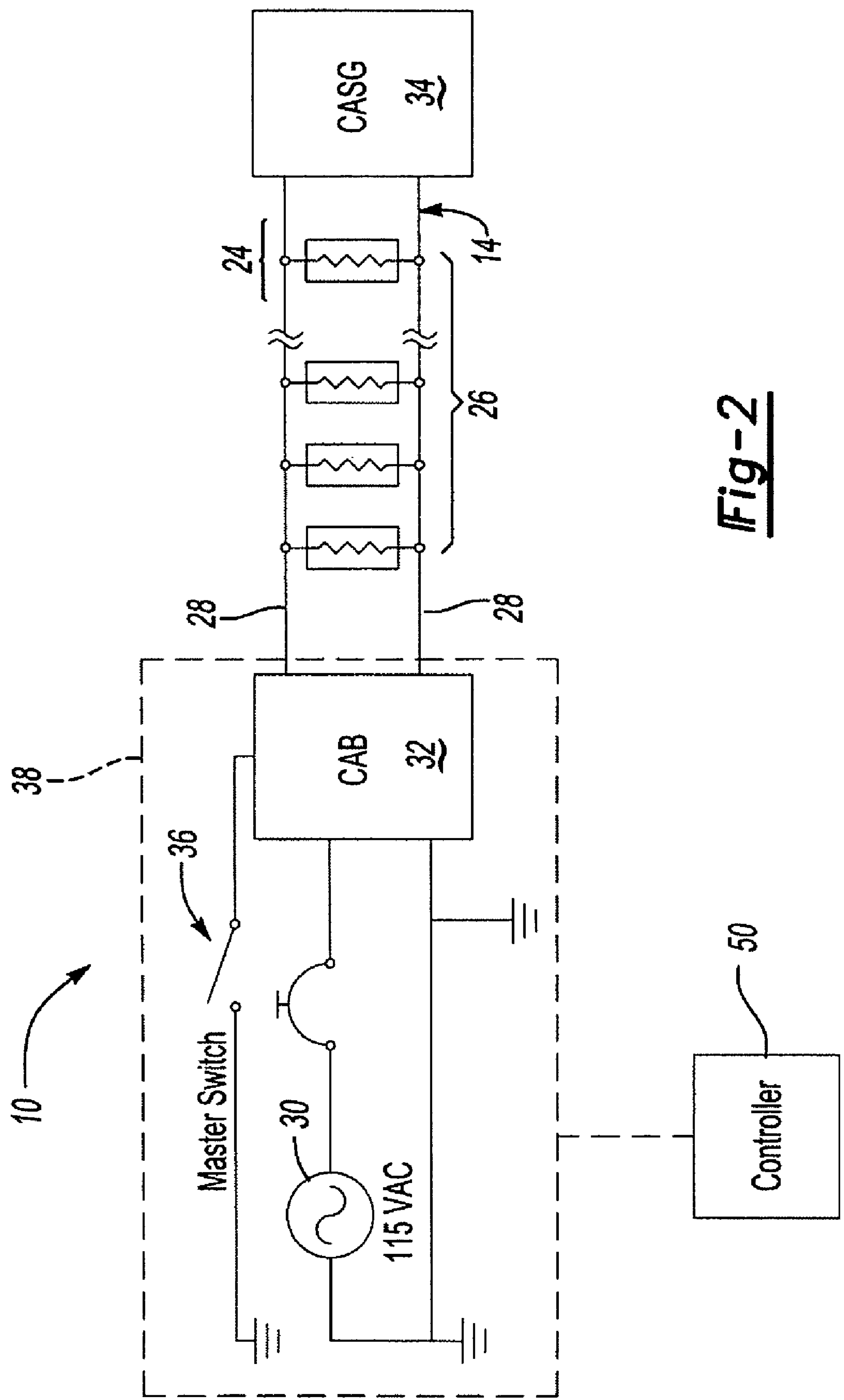
FIG. 2 is a schematic view of the safety system constructed according to the principles of the present invention.

Turning to FIG. 2, a preferred embodiment of the safety system 10 employed with the power distribution system will now be described in detail. The safety system 10 generally includes a circuit activator module or box (CAB) 32 and a circuit activator signal generator (CASG) 34, each coupled to the power distribution system 14.

The CAB 32 is an electronic unit operable for providing various signals and power currents through the power distribution system 14, as will be described in greater detail below. The CAB 32 is electrically coupled between the power source 30 and the seat tracks 28. As noted above, the seat tracks 28 are each integrated with the power distribution system 14 such that current is capable of passing through cables (not shown) along each seat track 28 and thereby into each seat group 24. The CAB 32 is also coupled to a master switch 36. The power source 30, the CAB 32, and the master switch 36 cooperate to form a subsystem referred to as a seat column power control box (PCB) 38.

The CASG 34 is an electronic unit for receiving the signals and power from the CAB 32 and providing a return activation signal, as will be described in greater detail below. The CASG 34 is coupled downstream of the PCB 38 to the power distribution system 14. In other words, the CASG 34 is coupled to the power distribution system 14 after the last seating group 24 to each of the seat tracks 28.

The CAB 32 and the CASG 34 may be located in various locations within the mobile platform 12. For example, the CAB 32 and CASG 34 may be located underneath the floor 20 or located within the seat track 28. Moreover, the entire PCB 38 and the CASG 34 may be switched in location such that the CASG 34 is located at the front of a seating column 26 and the PCB 38 is located after the seating column 26 without departing from the scope of the present invention.

With reference to FIGS. 3A through 3D, the operation of the safety system 10 will now be described. Initially, the CAB 32 is energized by the power supply 30 (see FIG. 2). When the master switch 36 (FIG. 2) is activated, the CAB 32 will send a low voltage high frequency signal 40 through the power distribution system 14. This low voltage high frequency signal 40 flows through the power distribution system 14 in the direction of the arrows. Low pass filters 42 installed within each seating group 24 block the low voltage high frequency signal 40 from passing therethrough. The low voltage high frequency signal 40 then passes through the CASG 34 and returns through the power distribution system 40 back to the PCB 38. In this embodiment, the CASG 34 is comprised of a high resistance, low impedance circuit, although other circuits may be used to pass the low voltage, high frequency signal 40 therethrough. The low voltage, high frequency signal is preferably approximately 100 kHz,2 VAC, though various other frequencies and voltages may be employed including direct current.

Figure 3A:
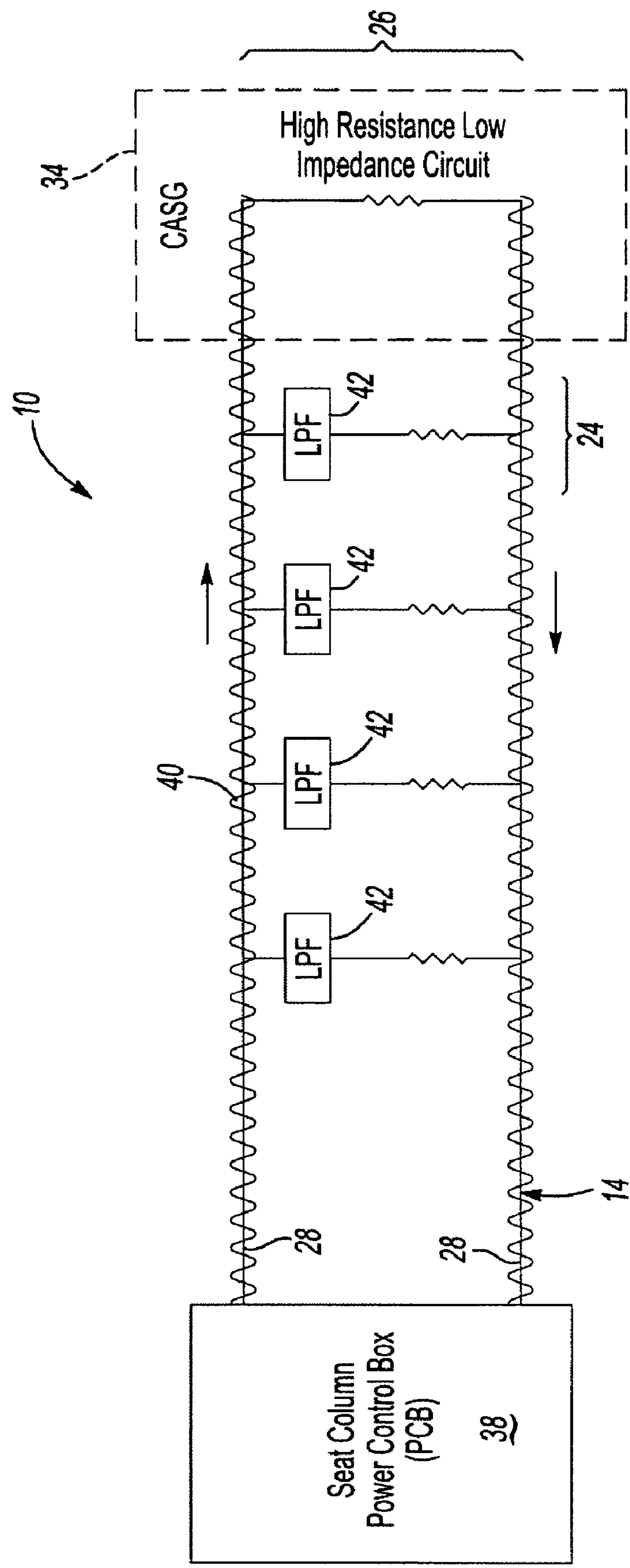
FIG. 3A is a schematic view of the safety system of the present invention coupled to a circuit having a low voltage high frequency signal passing therethrough.
Figure 3B:
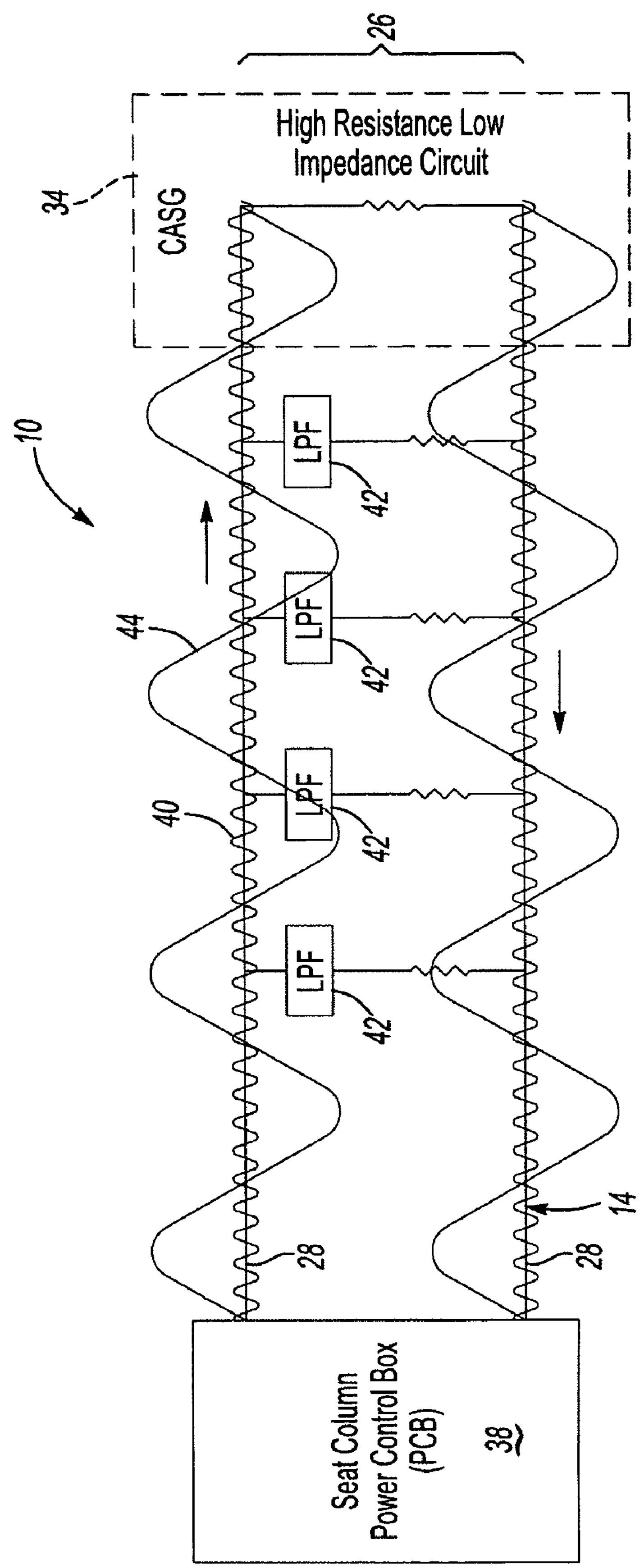
FIG. 3B is a schematic view of the safety system of the present invention coupled to a circuit having the low voltage high frequency signal and a full power current passing therethrough.

Turning to FIG. 3B, when the CAB 32 receives this low voltage signal 40, the CAB 32 through the PCB 38 activates and sends full current power, indicated by reference numeral 44, through the power distribution system 14. The full power 44 is preferably approximately 400 Hz, 115 VAC. The power 44 passes into each of the seat groups 24 thereby providing power to any systems located therein (represented by seat loads in FIGS. 3A-3D). Note again that the low pass filters 42 within each seat group 24 prevent the low voltage high frequency signal 40 from passing through the seat group 24. The low voltage high frequency signal 40 continues to pass through the power distribution system 14 at the CASG 34. The CAB 32 will continue to send full power 44 and the low voltage high frequency signal 40 through the power distribution system 14 so long as the master switch 36 (FIG. 2) is closed and the low voltage, high frequency signal 40 is received by the CASG 34 and/or CAB 32.

Figure 3C:
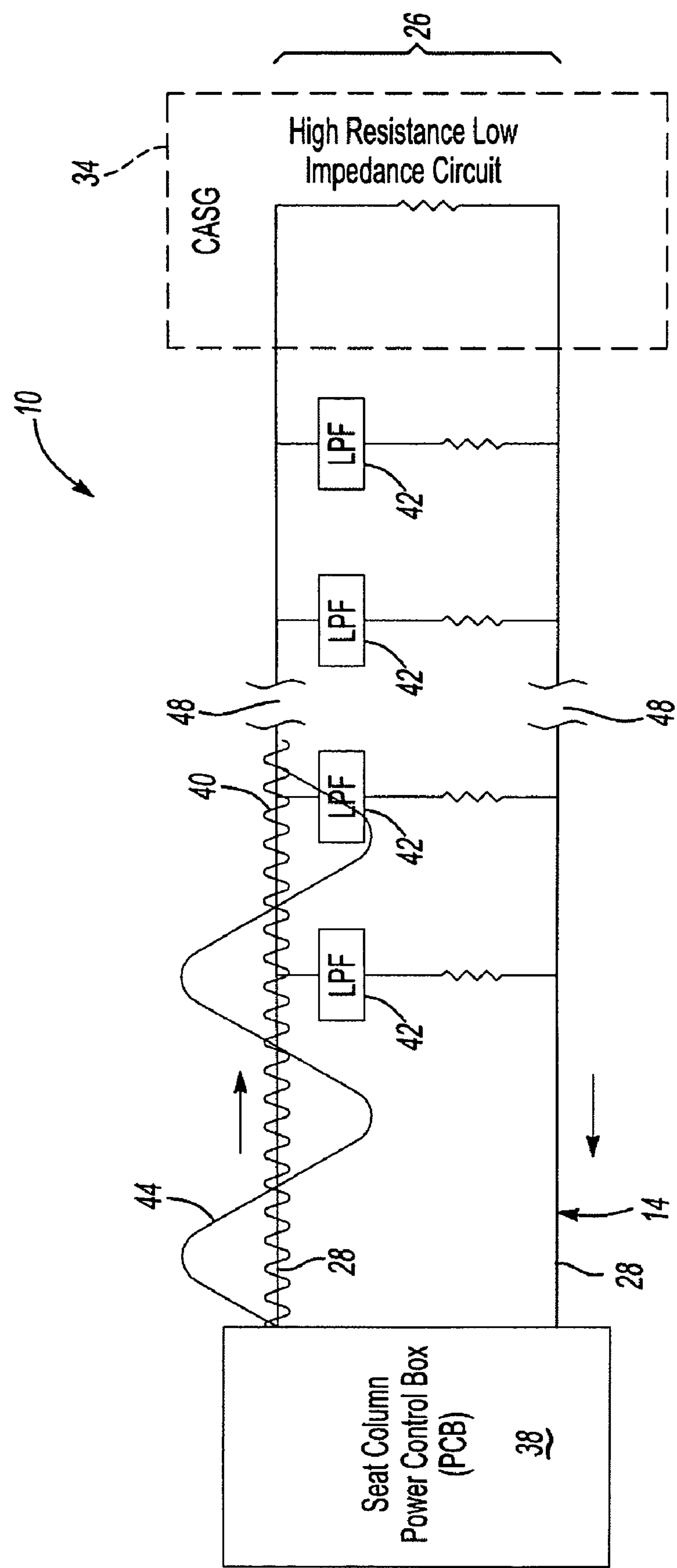
FIG. 3C is a schematic view of the safety system of the present invention during a break in a circuit coupled to the safety system.

Turning to FIG. 3C, if a break in the power distribution system 14 occurs, such as a disconnect 48 in the seat tracks 28, the low voltage high frequency signal 40 will be interrupted from passing through the CASG 34 and will not be returned to the CAB 32. However, full power 44 may still be temporarily provided from the PCB 38.

Figure 3D:
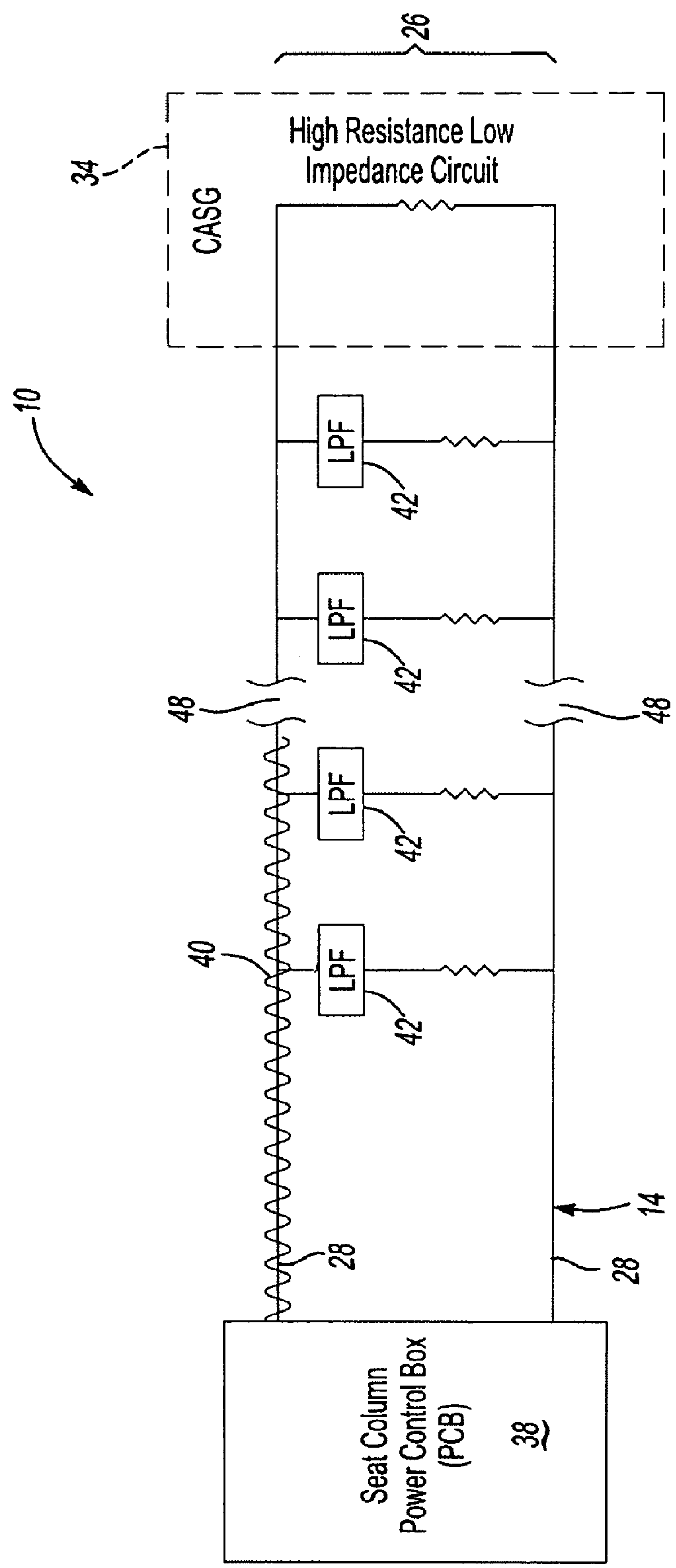
FIG. 3D is a schematic view of the safety system of the present invention after a break in a circuit coupled to the safety system.

With reference to FIG. 3D, once the low voltage high frequency signal 40 is no longer passing through the CASG 34 and onto the CAB 32, the CAB 32 will rapidly shut off the full power 44. Accordingly, in the event of a break, the safety system 10 ensures that only a safe low voltage signal is present within the seating column 26. Moreover, the CAB 32 may be coupled to a controller 50, shown in FIGS. 1 and 2, that notifies and alerts the users of the mobile platform 12 that a fault has occurred in the power distribution system 14.

In an alternate embodiment, the low voltage signal 40 is received by the CASG 34 and powers the CASG 34. In this embodiment, the low voltage signal 40 would be approximately 400 Hz, 30 VAC, although other voltages and frequencies may be used including direct current. When the CASG 34 receives this signal, it responds with an activation signal powered by the low voltage signal 40. The activation signal is preferably approximately 7,000 Hz, 5 VAC, although other voltages and frequencies may be used including direct current. The activation signal follows the same current path as the low voltage signal 40 shown in FIGS. 3A through 3D and thus in this alternative embodiment the portion of signal 40 that extends from the CASG 34 to the PCB 38 represents the activation signal. Alternatively, the CASG 34 could provide the activation signal using an internal rechargeable battery (not shown) located therein. The activation signal is then received by the CAB 32 and full power is supplied. If the activation signal is interrupted, the CAB 32 immediately shuts off full power. The activation signal could be superimposed over the full power using communication over power line technology.

All of the various embodiments assure that in the event of a break or fault within the power distribution system on a mobile platform, full power provided to the power distribution system will be immediately terminated. This ensures that only a safe low voltage signal is present within the seating columns and seating groups during the fault.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. An airborne mobile platform seat row power distribution safety system comprising:

a plurality of access points arranged in a plurality of rows throughout said mobile platform;

a power distribution system that transmits power to said access points located throughout said platform;

a plurality of filters that pass only electrical signals having a desired frequency, each one of said filters being associated with a specific one of said access points to block electrical signals that are not of said desired frequency from flowing to said access points;

a power control module electrically coupled to a power generating source that generates a first signal of a first voltage and a second signal of a second voltage for distribution throughout said power distribution system, said first voltage being lower than said second voltage and said first signal being of a frequency different than said desired frequency so as to be blocked from flowing to said access points by said filters; and a signal generator in electrical communication with said power distribution system that is operable to receive said first voltage and generate a third signal of a third voltage, said third voltage being lower than said second voltage, said third signal being of a frequency different than said desired frequency so as to be blocked from flowing to said access points by said filters;

said power control module being adapted to communicate said first signal to said signal generator through an entirety of said power distribution system with the exception that said first signal is blocked by said filters;

said signal generator being adapted to generate, upon receipt of said first signal, said third signal and to communicate said third signal to said power control module via said power distribution system;

said power control module being adapted to generate said second signal and communicates said second signal to said power distribution system upon receipt of said third signal, said second signal being of said desired frequency and applied to all of said access points via said power distribution system; and said power control module being adapted to prevent the generation of said second signal to said power distribution system if said third signal is not received.

2. The safety system of claim 1, wherein said access points are at passenger seats.

3. The safety system of claim 1, said power control module further comprising a circuit activator module adapted to generate said first signal of said first voltage.

4. The safety system of claim 1, wherein said third signal has a higher frequency than said second signal.

5. The safety system of claim 1, wherein said second voltage is approximately 115 volts.

6. The safety system of claim 1, wherein said second signal is transmitted to said access points when said power distribution system is fully functional.

7. A safety system for an aircraft power distribution system comprising:

a plurality of seat groups arranged in rows throughout the aircraft, each of said seat groups having at least one access point;

a power control module;

a signal generator;

a power distribution system electrically coupled between said power control module and said signal generator; and a plurality of filters that pass only electrical signals having a desired frequency, each one of said filters is associated with a specific one of said seat groups to block electrical signals that are not of said desired frequency from flowing to said seat groups and said access points;

said power control module is adapted to provide a first signal of a first voltage to said signal generator through said power distribution system;

said power control module is adapted to provide a second signal of a second voltage greater than said first voltage to said power distribution system upon receipt of an activation signal from said signal generator, said activation signal is transmitted back to said power control module if the electrical integrity of said power distribution system is intact;

said first signal and said activation signal each have a frequency different than said desired frequency so as to be blocked from flowing to said seat groups and said access points by said filters; and said power control module is adapted to refrain refrains from providing said second voltage to said power distribution system when said activation signal is not transmitted back to said power control module and the electrical integrity of said power distribution system is not intact.

8. The safety system of claim 7, wherein said power control module further comprises a circuit activator module adapted to generate said first signal.

9. The safety system of claim 7, wherein said second voltage is approximately 115 volts.

10. The safety system of claim 7, wherein said second signal is transmitted to said access points when said power distribution system is intact.

11. The safety system of claim 7, further comprising a controller coupled to said power control module that provides a user with the status of the electrical integrity of said power distribution system.

12. The safety system of claim 7, wherein said activation signal comprises said first signal.

13. A method for communicating electrical signals throughout an airborne mobile platform comprising:

generating a first electrical signal of a first voltage by a power control module;

transmitting a first signal through a power distribution system to a signal generator circuit;

generating a second signal of a second voltage by a circuit activator signal generator in response to receipt of the first signal by the circuit activator signal generator;

blocking the first electrical signal and the second electrical signal from flowing to a plurality of access points arranged in a plurality of rows throughout said mobile platform with a plurality of filters, each filter being associated with a specific one of said access points;

generating a third signal of a third voltage by the power control module upon receipt of the second signal by the power control module, the third voltage being greater than the first voltage and the second voltage; and using the power control module to refrain from generating the third electrical signal when the second signal is not received by the power control module from the power distribution system.

14. The method of claim 13, wherein said generating operation further comprises generating the first electrical signal with a circuit activator module.

15. The method of claim 13, wherein the generation operation further comprises generating the third voltage at approximately 115 volts.

16. The method of claim 13, further comprising the operation of notifying a user of the status of the power distribution system using a controller.

17. The method of claim 13, wherein the second signal has a higher frequency than the third signal.

* * * * *